United States Patent [19]

Tsay et al.

[11] 4,010,080
[45] Mar. 1, 1977

[54] SOLAR POWERED DISTILLING DEVICE

[76] Inventors: Yaw Jenn Tsay; Kuo-Chuan Lin, both of No. 10, Lane 177, Pei Hsing Street, Chia I, Taiwan, China /Taiwan

[22] Filed: Mar. 3, 1976

[21] Appl. No.: 663,633

[52] U.S. Cl. .................................. 202/83; 126/271; 202/193; 202/234; 203/10; 203/DIG. 1
[51] Int. Cl.² ........................ C02B 1/06; C02B 1/08
[58] Field of Search ................. 202/83, 189–193, 202/234; 203/10, DIG. 1; 350/211; 126/271

[56] References Cited

UNITED STATES PATENTS

| | | | |
|---|---|---|---|
| 1,588,192 | 6/1926 | Schermerhorn | 202/191 X |
| 2,277,311 | 3/1942 | Freeman | 126/271 |
| 2,975,107 | 3/1961 | Friedman | 203/DIG. 1 X |
| 3,125,091 | 3/1964 | Sleeper | 350/211 X |
| 3,269,920 | 8/1966 | Merrill | 203/10 X |
| 3,357,897 | 12/1967 | Salzer | 202/83 X |
| 3,455,790 | 7/1969 | Marks | 203/10 X |
| 3,870,605 | 3/1975 | Sakamoto | 202/190 X |

Primary Examiner—Norman Yudkoff
Assistant Examiner—D. Lovercheck
Attorney, Agent, or Firm—Shoemaker and Mattare, Ltd.

[57] ABSTRACT

A solar powered distilling device, and more particularly, a device wherein a plurality of convex lenses concentrate the heat energy of sunlight to heat and vaporize a quantity of water, said water vapor rising from a vaporization chamber to a cooling chamber by virtue of spaces provided between troughs located there between, the water vapor is cooled by virtue of the circulating air in an air cooling chamber condensing the vapor into water droplets; said droplets being collected in said collection troughs provided for this purpose.

16 Claims, 5 Drawing Figures

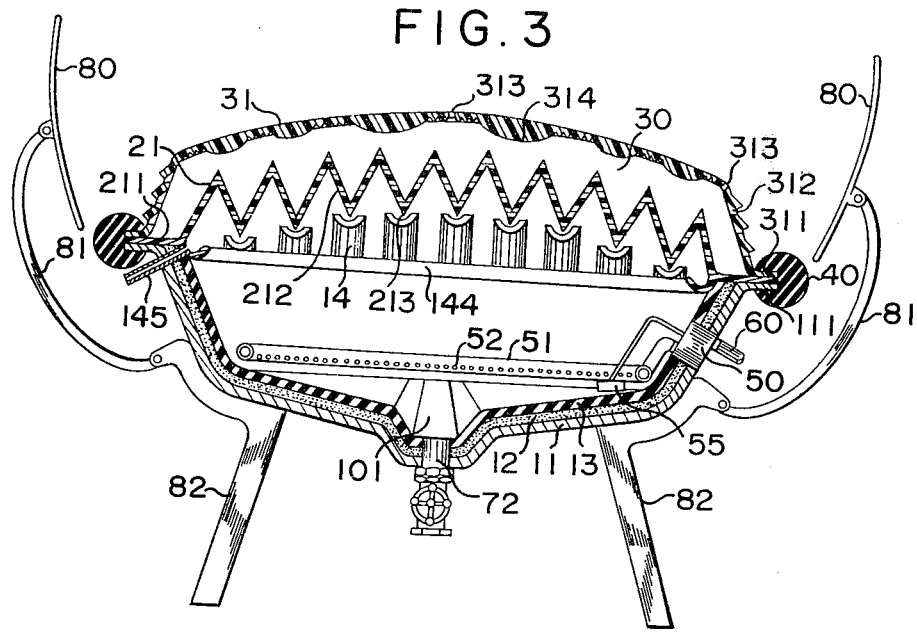
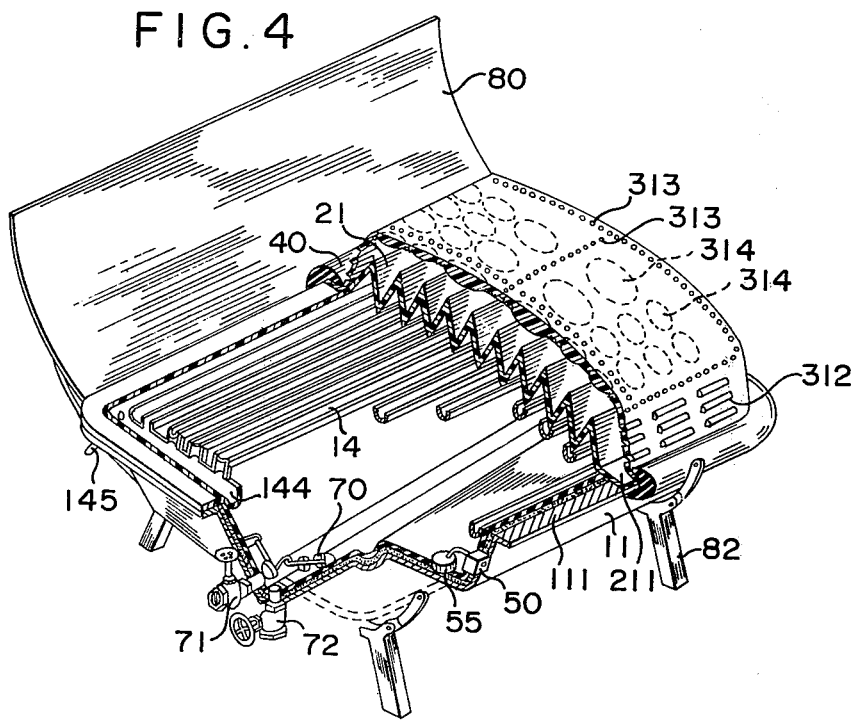

SOLAR POWERED DISTILLING DEVICE

BACKGROUND OF THE INVENTION

Conventional methods of producing distilled water rely on using electricity or fueled fire to heat cold water. The use of combustible materials or electricity to produce distilled water is not economically sound. In addition, the apparatus involved is generally large and the process quite complex, making the price for such apparatus high. For these reasons, generally only hospitals, pharmaceutical and chemical plants are equipped with means to produce distilled water. It has not been possible or economically reasonable for the general public to produce its distilled water in the home.

The purpose of the present invention is to improve the above mentioned defects and to provide an automatic water distiller of simple construction which is safe and convenient and which is not susceptible to malfunctions.

Another purpose of the present invention is to provide an automatic water distilling device which may be installed on the roof of any home, office, school, etc. at low cost, or which may be conveniently used on fishing vessels and the like.

DETAILED DESCRIPTION OF THE INVENTION

Further purposes and advantages of the present invention will become obvious as it is now explained with reference to the appended drawings wherein:

FIG. 3 is a perspective view in partial cross section of another embodiment thereof;

FIG. 4 is a cross sectional view of the same embodiment as in FIG. 3;

Figure 1:
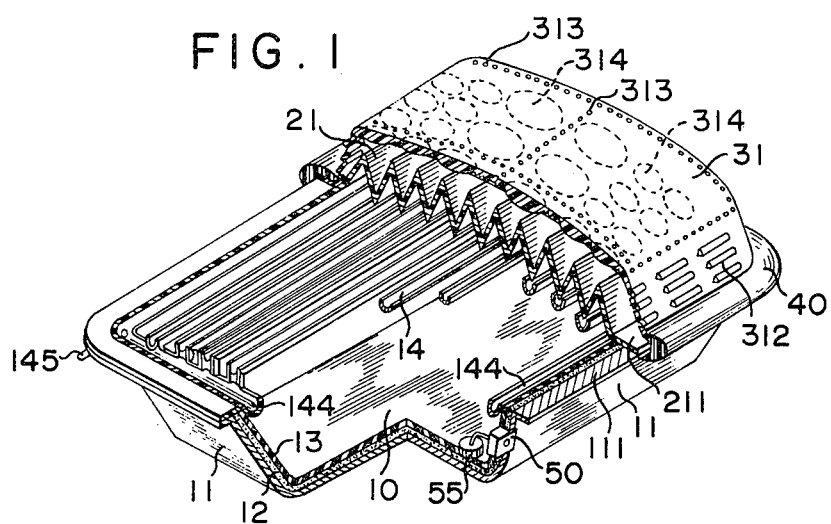
FIG. 1 is a perspective view in partial section of an embodiment of the present invention.
Figure 2:
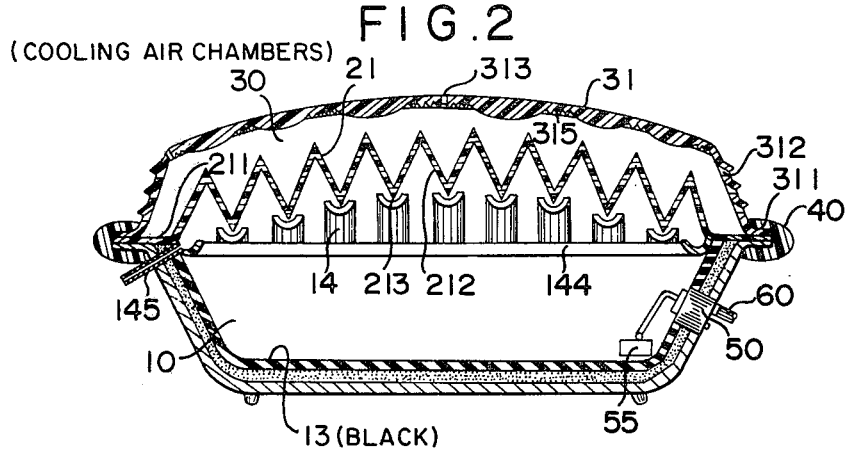
FIG. 2 is a cross sectional view thereof.
Figure 5:
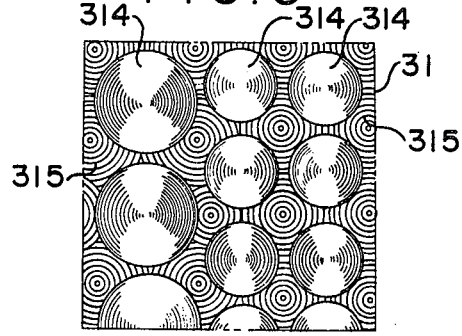
FIG. 5 is a view of the lens cover according to the present embodiments of the present invention.

As shown in FIGS. 1, 2 and 5, the water distilling device according to the present invention is a box-like structure. The bottom portion of said structure consists of a bottom plate 11 having sides inclined outwardly, which is made of metal or any suitable material, an insulating layer 12, and a heat absorbing plate 13, which are layered together to form a vaporizing chamber 10 which also serves as the reservoir. The heat absorbtion plate 13 is a rubber plate or any suitable material and is of a dark coloring, such as black, dark green, etc., for the purpose of absorbing as much heat as possible to heat the water. The insulating layer 12 may be made of polystyrene foam or any suitable insulating material to isolate the inside of the vaporizing chamber 10 from the outside temperature. The upper portion of the vaporizing chamber 10 is layed over with a plurality of condensate collection troughs 14—14. The bottom of all of the troughs 14 end in a main water collecting trough 144. A transparent lens cover 31 is provided over the condensation plate 21 and is supported thereover by virtue of end support sections 311 which are supported on top of the end support section 111, and 211. In this way, a cooling air chamber 30 is formed between the condensation plate 21 and the lens cover 31. The end sections are sealed together by means of a rubber or plastic strip 40 which is secured along the periphery of the device.

Each downward sloping wall of the lens cover 31 is provided with a plurality of openings or vents 312—312; the top portion is provided with a plurality of small holes 313—313. The outer surface of the top portion of the lens cover 31 is generally smooth. The inner surface is provided with a plurality of convex lenses 314—314 of various diameters and thickness thereon. The spaces between the lenses 314—314 of the lens cover 31 are formed in a plurality of alternately concave and convex annular rings 315—315 to form a ripple like design thereon.

Water enters the vaporization chamber 10 by means of a feed hose 60 and an automatic valve 50. Said automatic valve is provided with a float 55 to open the valve when the water level falls below a specified level and to close the valve when the water level attains a second specified level.

Because the convex lenses 314 are of different sizes and thicknesses, the heat focus points relative thereto will be at different levels in the vaporization chamber 10 to insure greater efficiency. The rings 315 will cast a plurality of heat focus points on the surface of the water and in the air above, thus raising the temperature within the vaporization chamber 10.

When the vaporization chamber 10 is filled with water; the water is heated by virtue of the capacity of the lens cover 31 to cause rays of sunlight to converge at various focus points in, on, and above the water. As the water is vaporized, the vapor rises between the troughs 14 and comes into contact with condensation plate 21. Cool air enters cooling air chamber 30 by means of the plurality of vents 312—312. As cool air passes between the condensation plate 21 and lens cover 31, the temperature of said condensation plate 21 is maintained at a much lower level than that of the water vapor, so that when the water vapor comes into contact with the inclined sides 212 of the condensation plate 21, it will be condensed to water droplets. As the water droplets accumulate and increase in size, they will flow down from the inclined sides 212 to sharp bottom edges 213 of the condensation plate 21 into the troughs 14 below the bottom edges 213 of the condensation plate, wherefrom the accumulated water will flow downwards and into the trough 144. The distilled water will then flow through a hose 145 and into a receptacle not included in the scope of the present invention and not shown in the appended drawings.

FIG. 3 & 4 show another embodiment of the present invention which is essentially as that described above, but which is adapted to distill sea or salt water so that it may be used on small or large fishing vessels or the like. According to this embodiment, the bottom of the device is angular, sloping down towards the center from both sides. The center or lowest portion thereof is provided with a trough 101, said trough 101 being provided with a float 70 to automatically open an outlet 71 when the quantity of water falls to a specified level. In this way, the remaining water, which will contain a high density of salt, may be drained from the vaporization chamber 10. As the salt may tend to crystallize on the sloping bottom surface, water pipes 51—51 are provided along the bottom periphery of the vaporization chamber 10. These pipes are connected to each other in a suitable fashion and in turn connected to the inlet valve 50, so that when the valve 50 is opened, water will enter the vaporization chamber 10 from all sides by virtue of holes 52—52, washing any remaining salt crystals down to the trough 101. To remove these salt crystals from the vaporization chamber 10, a larger outlet valve 72 is provided at the bottom of the trough 101.

Either of the two embodiments described above may be provided with reflecting mirrors 80 which may be attached to a base 82 by means of a pivotedly connected mirror brace 81. By virtue of the arched surface of the arched surface of the mirror 80, the maximum effectiveness may be derived from direct and indirect sunlight.

Experiments by the present inventor have shown that a device as described above, 3 × 4 feet × 1 foot 4 inches will produce 5 liters of distilled water in a 24 hour period on overcast winter days, and over 30 liters in the same amount of time during sunny summer weather.

The distilled water produced by this method has been tested and found to be as healthful as distilled water produced by conventional means.

What I claim is:

1. A distilling device powered by solar energy comprising:
    a housing for defining a vaporization chamber;
    a transparent cover on said housing;
    a transparent condensation plate mounted on said housing to define a pair of separated chambers including a cooling air chamber defined by one side of said plate and said cover, said vaporization chamber being defined by the other side of said plate and said housing;
    fluid inlet means on said housing for conducting fluid to be vaporized into said vaporization chamber;
    a plurality of solar energy focusing lenses on said cover focusing solar energy through said cooling air chamber and said condensation plate onto the fluid located in said vaporization chamber to form vapor;
    air inlet means on said cover for conducting cooling air into said cooling air chamber to contact said condensation plate one side for maintaining said plate at a temperature below the condensation temperature of the fluid in said vaporization chamber so that vapor formed in said vaporization chamber is condensed into condensate upon contact with said plate other side;
    a condensate collecting means connected to said housing for collecting for condensate formed on said condensation plate; and
    outlet means connected to said condensate collecting means for withdrawing the collected condensate from said housing.

2. The device of claim 1 wherein said condensate collecting means includes a plurality of troughs and a main trough fluidly connected to each of said plurality of troughs, said troughs being located in said vaporization chamber and being spaced apart distances sufficient to allow passage therebetween of the vapor formed in said vaporization chamber.

3. The device of claim 2 wherein said condensation plate comprises a plurality of peaks and valleys with said valleys located adjacent said collection troughs.

4. The device of claim 3 wherein each valley is located adjacent one of said collection troughs.

5. The device of claim 1 wherein said condensation plate is located beneath said cover and said condensate collecting means is located beneath said condensation plate.

6. The device of claim 1 wherein said air inlet means includes vents defined in said cover.

7. The device of claim 1 further including a plurality of focusing rings located on said cover for focusing solar energy into said vaporization chamber at various locations on the surface of the fluid located in said vaporization chamber.

8. The device of claim 7 wherein said rings are alternatively concave and convex.

9. The device of claim 1 wherein said plurality of lenses comprise lenses having different focal points so that solar energy is focused at different levels in said vaporization chamber.

10. The device of claim 1 wherein said lenses are located inside said cooling air chamber.

11. The device of claim 1 further including a layer of heat absorbing material located on said housing in said vaporization chamber.

12. The device of claim 1 wherein said fluid inlet means includes a float valve.

13. The device of claim 1 further including cleansing means positioned in said housing to be located in said vaporization chamber for circulating drainage fluid therethrough to cleanse said vaporization chamber.

14. A device as in claim 1 further including at least one reflecting mirror connected to said housing to focus solar energy on said lenses to increase the amount and intensity of heat from the sun incident on the plurality of lenses.

15. A distilling device powered by solar energy comprised of a metallic plate, an insulating plate and a heat absorbtion plate stacked together to form the bottom portion of a box-like structure; a plurality collection troughs suspended in said box-like structure over the bottom portion; a transparent cover connected to the box-like structure and being provided with convex lenses of various thicknesses and sizes thereon, and a plurality of annular rings in the spaces between the lenses, a transparent, solid plate connected to said box-like structure being of an exaggerated corrugated configuration; the plate being located between the cover and the bottom to form a vaporization chamber beneath the plate, and a cooling air chamber above the plate.

16. The device of claim 15 further including means connected to the box-like structure to be located in said vaporization chamber to divide that chamber into an upper vaporization chamber adjacent the plate and a lower vaporization chamber adjacent the bottom portion.

* * * * *